Jan. 26, 1954     W. A. BEDFORD, JR     2,666,968

FASTENING DEVICE

Filed May 14, 1952

INVENTOR:
WILLIAM A. BEDFORD JR.,
BY Robert E Ross
AGENT.

Patented Jan. 26, 1954

2,666,968

UNITED STATES PATENT OFFICE 2,666,968

FASTENING DEVICE

William A. Bedford, Jr., North Scituate, Mass., assignor to United-Carr Fastener Corporation, Cambridge, Mass., a corporation of Massachusetts Application May 14, 1952, Serial No. 287,749

5 Claims. (Cl. 24—73)

This invention relates generally to fastening devices, and has particular reference to a fastener adapted for snapping engagement into an opening in a sheet metal panel.

In the construction of automobiles and the like, various parts of the assembly, such as wires, conduits, tubing, and molding must be attached to sheet metal panels. Since the position of many of the openings cannot be predetermined with a sufficient degree of accuracy, some openings must be drilled on the assembly line rather than formed by pre-punching. Hence, it is desirable that such fasteners be designed for assembly into a round opening.

It is also desirable that such fasteners be so designed that lateral shifting on the panel is prevented, and so that shear forces tending to cause such lateral shifting does not affect the means used for snapping engagement with the panel. For the greatest economy of material, the attaching means is sometimes taken out of the base of the fastener which is to be superimposed onto the panel. However, the amount of such material that can be removed from the base is limited, since otherwise the base is considerably weakened. Such limitation on the amount of material that can be used imposes a severe limitation on the design of the attaching means.

The object of the invention is to provide a fastening device to meet the above requirement in which an attaching member formed from a minimum amount of material of the base is designed to resist lateral movement on the panel without affecting the engagement with the panel.

Figure 1:
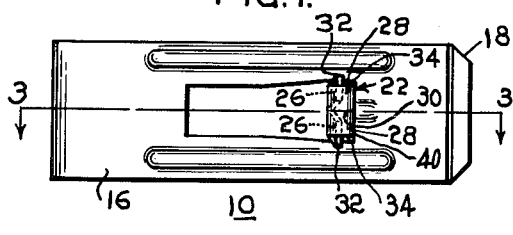
Fig. 1 is a bottom plan view of a wiring fastener embodying the features of the invention.
Figure 2:
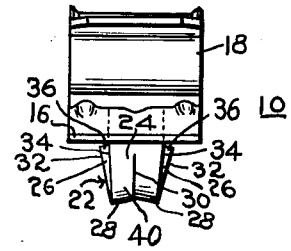
Fig. 2 is an end view of the fastener of Fig. 1.

Referring to Figs. 1 through 8 of the drawing, there is illustrated a wiring fastener 10, which is adapted for snapping engagement into an opening 12 in a supporting panel 14.

The fastener 10 comprises a base 16, a wire-retaining member 18 joined to one end of the base so that a wire 20 or the like may be retained therebetween, and an attaching portion 22 extending downwardly from the base.

Figure 3:
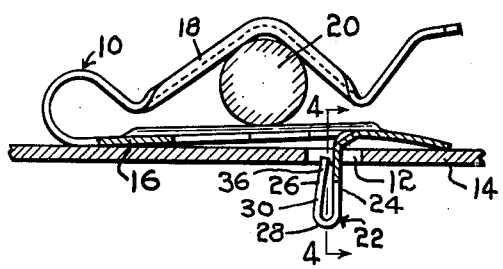
Fig. 3 is a section taken on line 3—3 of Fig. 1.

The attaching portion 22 is formed from a single tongue taken from the base, which is formed into a shank 24 and a pair of legs 26 joined to the end of the shank at reverse bend portions 28 so as to extend back toward the base in a manner to be described hereinafter. The legs are formed by providing a longitudinal split 30 which extends a substantial distance up the shank, and the two legs so formed are bent back to lie on the same side of the shank with the reverse bend portions 28 being in substantial abutting relation, and being inclined away from each other as they extend toward the base, with the outer edges 32 being inclined outwardly beyond the opposite edges 34 of the shank (see Figs. 2 and 4) and terminating in free ends 36 which are disposed in spaced relation to the base. The legs 26 are spaced from the plane of the shank at the lower end of the attaching portion, due to the radius of curvature of the reverse bend portions 28, and are inclined toward the plane of the shank as they extend toward the base, as illustrated in Fig. 3.

The portion 38 of the shank adjacent the base has a width substantially equal to the diameter of the opening 12, and tapers to a portion 40 adjacent the reverse bend portions which is substantially narrower than the portion 38.

Figure 4:
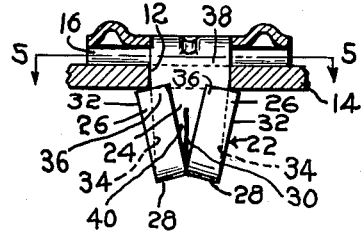
Fig. 4 is a view in section taken on line 4—4 of Fig. 3.
Figure 5:
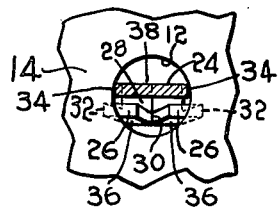
Fig. 5 is a view in section taken on line 5—5 of Fig. 4.
Figure 6:
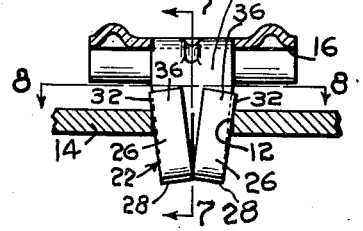
Fig. 6 is a view in section similar to Fig. 4 illustrating the action of the attaching portion of the fastener during assembly.
Figure 7:
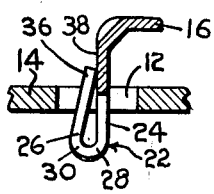
Fig. 7 is a view in section taken on line 7—7 of Fig. 4.
Figure 8:
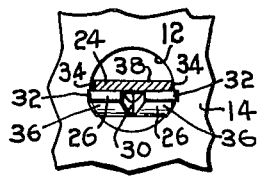
Fig. 8 is a view in section taken on line 8—8 of Fig. 6.

The assembly of the device into the opening 12 is accomplished in the usual manner, by forcing the attaching portion into the opening so that the legs 26 flex together by reason of the edges 32 with the edges of the opening, until the free ends can snap outwardly behind the panel as shown in Fig. 4. The legs are capable of a relatively large amount of flexing by reason of the split extending up the shank, since the flexing of the legs causes torsional bending of the opposite halves of the split shank. This allows the legs to flex a relatively large distance without permanent deformation, so that the legs can enter a relatively small hole, and yet spring back to pass far enough behind the panel to provide a strong holding action.

Since the portion 38 of the shank has a width substantially equal to the diameter of the opening 12, the shank can completely enter the opening only when the shank extends across the center thereof, and consequently after such assembly, movement of the shank laterally in any direction is prevented. The inclination of the legs 26 toward the plane of the shank, so that the free ends of the legs are positioned relatively close to the plane of the shank reduces the tendency of the legs to force the shank laterally during insertion. Since the fastener is ordinarily formed of hardened high carbon steel, and the panel usually formed of relatively soft low carbon steel, if the upper ends of the legs were spaced any appreciable distance from the shank, the tendency of the legs to push the shank off center in the opening during insertion would cause the tapered portion of the shank, in entering off center, to cut into the edges of the opening. Only a small lateral force would then be required to push the shank into a central position, and the shank would thereafter be loose in the opening, so that lateral forces would cause lateral movement of the fastener, which would damage the holding action of the legs.

Figure 9:
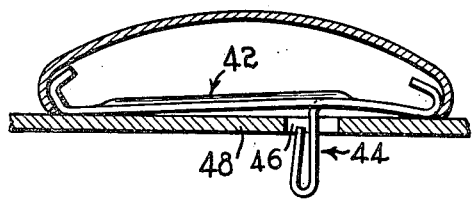
Fig. 9 is a view in section of a molding fastener embodying the features of the invention.

Referring to Fig. 9, there is illustrated a molding fastener 42, which has an attaching portion 44 similar to that described above. The molding fastener 42 is assembled into an opening 46 in a panel 48 in a manner similar to the manner of assembly of the wiring fastener 10.

Since certain other obvious modifications may be made in the device without departing from the scope of the invention, it is intended that all matter contained herein be interpreted in an illustrative and not in a limiting sense.

I claim:

1. A fastening device for snap fastener engagement in a support opening, comprising a base and a single attaching shank extending therefrom, said shank having a longitudinally split end forming a pair of legs, said legs being bent transversely back to lie flatwise alongside the shank and extend toward the base, said legs being in substantial abutting relation at the bends and being inclined away from each other toward the shank and having opposite edge portions projecting from opposite sides of the shank in inclined relation thereto.

2. A fastening device for snap fastener engagement in a support opening, comprising a base and a single attaching shank extending therefrom, said shank being substantially flat and having a longitudinally split end portion forming a pair of legs, said legs being bent transversely back to extend flatwise alongside the shank, said legs being in substantial edgewise abutting relation at the bends and diverging toward the base so that opposite outer edges of the legs are inclined outwardly in relation to the edges of the shank.

3. A fastening device for snap fastener engagement in a support opening, comprising a base and an attaching shank extending therefrom, said shank being substantially flat and having a pair of legs formed on the end thereof which are bent transversely back to lie flatwise alongside the shank on the same side thereof and extend toward the base, said legs being in substantially edgewise abutting relation at the junction with the shank, and diverging toward the base so that the outer edges thereof are inclined outwardly beyond the edges of the shank, said shank having a longitudinal split extending from the junction with the legs a substantial distance toward the base, and being unsplit at the junction with the base.

4. A fastening device for snap fastener engagement in a support opening, comprising a base and an attaching shank extending therefrom, said shank being substantially flat with the portion adjacent the base having a width substantially equal to the diameter of the opening into which it is to be assembled, and having an end portion narrower than said portion adjacent the base, said shank being split longitudinally from the end forming a pair of legs, said legs being turned back transversely to lie flatwise alongside the shank on the same side thereof and extend toward the base, said legs being in substantial abutting relation at the bends and being inclined away from each other so that opposite outer edges are inclined outwardly beyond the edges of the shank, said legs also being inclined toward the plane of the shank.

5. A fastening device for snap fastener engagement in a support opening, comprising a base and an attaching shank extending therefrom, said shank being substantially flat with the portion adjacent the base having a width substantially equal to the diameter of the opening into which it is assembled, and having an end portion narrower than said portion adjacent the base, and a pair of legs disposed on the end of the shank, said legs extending back alongside the shank on the same side thereof toward the base, and being in substantial edgewise abutting relation at the junction with the shank and being inclined away from each other toward the base so that opposite outer edges thereof are inclined outwardly beyond the edges of the shank, said legs being spaced from the plane of the shank at the junction therewith and being inclined toward the plane of the shank, said shank being split longitudinally from the junction with the legs a substantial distance toward the base, and being unsplit at the junction with the base.

WILLIAM A. BEDFORD, Jr.

References Cited in the file of this patent

UNITED STATES PATENTS

| Number | Name | Date |
| --- | --- | --- |
| 2,180,925 | Dyresen | Nov. 21, 1939 |
| 2,194,855 | Jones | Mar. 26, 1940 |